United States Patent [19]

Smith

[11] 4,419,772
[45] Dec. 13, 1983

[54] WATER SAVER

[76] Inventor: Clark K. Smith, 1004 Wedgewood La., Durham, N.C. 27713

[21] Appl. No.: 338,884

[22] Filed: Jan. 12, 1982

[51] Int. Cl.³ .............................................. E30D 1/20
[52] U.S. Cl. ......................................... 4/364; 4/324; 4/365; 4/415
[58] Field of Search ................... 4/363, 365, 415, 364, 4/324, 325, 326

[56] References Cited

U.S. PATENT DOCUMENTS

| | | | |
|---|---|---|---|
| 468,725 | 2/1892 | Malcolm | 4/365 |
| 576,006 | 1/1897 | Tilden . | |
| 946,130 | 1/1910 | Hawkins | 4/364 |
| 1,037,679 | 9/1912 | Snyder | 4/363 |
| 2,349,015 | 5/1944 | Stalcup . | |
| 2,644,950 | 7/1953 | Chapman . | |
| 4,120,056 | 10/1978 | Phripp et al. | 4/324 |
| 4,178,644 | 12/1979 | Zarlengo | 4/415 X |
| 4,225,985 | 10/1980 | Joshi et al. | 4/415 X |

FOREIGN PATENT DOCUMENTS 474 of 1871 United Kingdom .................... 4/365
353 of 1874 United Kingdom .................... 4/415

Primary Examiner—Charles E. Phillips
Attorney, Agent, or Firm—Blair, Brown & Kreten

[57] ABSTRACT

A water saver for the water closet of a flush toilet, which allows the operator to vary the amount of water being used according to the requirements of the situation. A lever on the exterior of the water closet controls the egress of water from a separate secondary reservoir contained within the water closet. Varying the position of the lever varies the amount of water which escapes from a trap door on the secondary reservoir attached to the lever. When very little water is required for the flushing process the secondary reservoir remains undisturbed. However, if the entire amount of water contained within the water closet is required then the secondary reservoir will empty completely because of the position of the control lever. The amount of water that escapes from the secondary reservoir, which varies from all to none, is determined by the position of the trap door in relation to the walls of the reservoir, which varies the effective volume of the reservoir.

20 Claims, 6 Drawing Figures

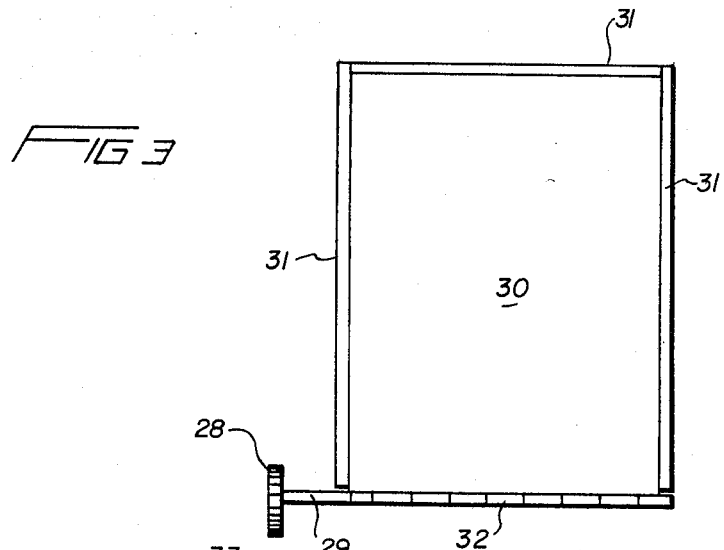
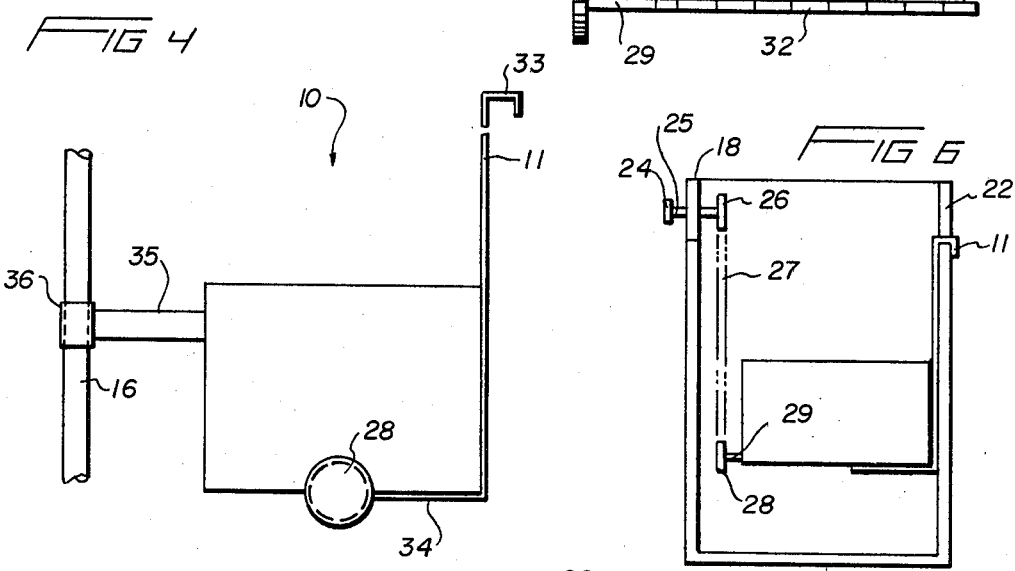
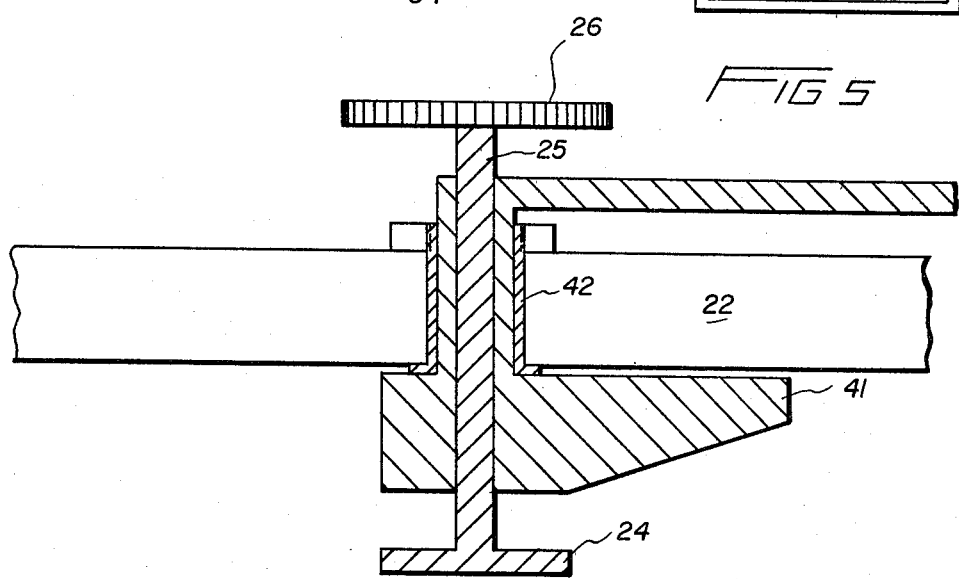

WATER SAVER

BACKGROUND OF THE INVENTION

Many of America's resources that were once taken for granted must now be monitored carefully in order to ensure an ample supply for future generations. Water is among the most precious yet most abused of these resources. The average American in a metropolitan area consumes over 200 gallons of water per day. The enormous aquafers underlying the central plains area are quickly being depleted. Measures must be taken in order to conserve this and other natural water resources. As those citizens in the more arid areas of this country have proven, a little bit of conservation goes a long way.

Large quantities of water are consumed in the typical bathroom. In fact, the toilet fixture in a bathroom is one of the largest consumers of water. The average flush of a toilet consumes approximately five gallons of water. Five gallons is usually far in excess of the amount required for a salubrious evacuation of the toilet bowl. In most instances far less water could be used to accomplish the task. Therefore, a strong felt need exists to vary the amount of water consumed during the flush of a toilet according to the requirements of the event.

The following patents reflect the state of the art of which applicant is aware, in so far as these references appear germane to the patent process.

| | |
|---|---|
| 468,725 Malcolm | 2,349,015 Stalcup |
| 576,006 Tilden | 2,644,950 Chapman |
| 1,037,679 Snyder | 4,120,056 Phripp et al. |

Of the references cited it is believed that the patent to Snyder is the closest to the instant invention. Snyder teaches the use of a flushing apparatus having a first float 23 and a second float 13 defined by a rectangular chamber which is alternatively opened and closed through a flap valve 17 so that it alternates between serving as a float and a second water compartment. The instant application is distinguished in that its novel configuration does not require complicated mechanical adjustment to the interior of the water closet in order to vary the amount of water used.

The patent to Phripp et al. also teaches the use of an alternate reservoir to control the amount of water used. However, once again the amount of water can only be varied by a mechanical adjustment inside the water closet itself. In comparison, the instant invention is designed to permit easy exterior control of the amount of water retained in the alternate reservoir.

The remaining references show the state of the art further.

OBJECTS AND SUMMARY OF THE INVENTION

Accordingly a primary object of this invention is to provide a new and novel apparatus which will aid in the conservation of America's water resources by reducing the amount of water condensed when a toilet is flushed.

Another object of this invention is to provide a new and novel apparatus to variably control the amount of water used when a toilet is flushed so that only the amount actually required is used, instead of emptying the entire contents of the water closet each time the toilet is flushed.

A further object of this invention is to provide a new and novel apparatus which permits the amount of water consumed to be varied accordingly prior to each individual flush of the toilet.

Still another object of this invention is to provide a new and novel water saving apparatus for toilets which can easily be retrofitted to all presently existing water closets.

The objects stated above and other related objects are accomplished by the provision of a secondary reservoir within the water closet which variably retains a quantity of the contents of the water closet during the flushing process. The secondary reservoir is provided with a self-sealing, hinged door on the bottom. So that the position of the door in relation to side walls of the reservoir determines the volume of water retained by the reservoir, the position of the reservoir door is controlled by an exterior control handle.

BRIEF DESCRIPTION OF THE DRAWING FIGURES

FIG. 3 is a top view of the reservoir door;

FIG. 4 is a front view of the reservoir and its alternate mounting bracket.

FIG. 5 is a sectional view of the control lever deployed through the center of the flushing handle; and FIG. 6 is an end view of a typical water closet with the instant apparatus installed.

DESCRIPTION OF THE PREFERRED EMBODIMENT

Figure 1:
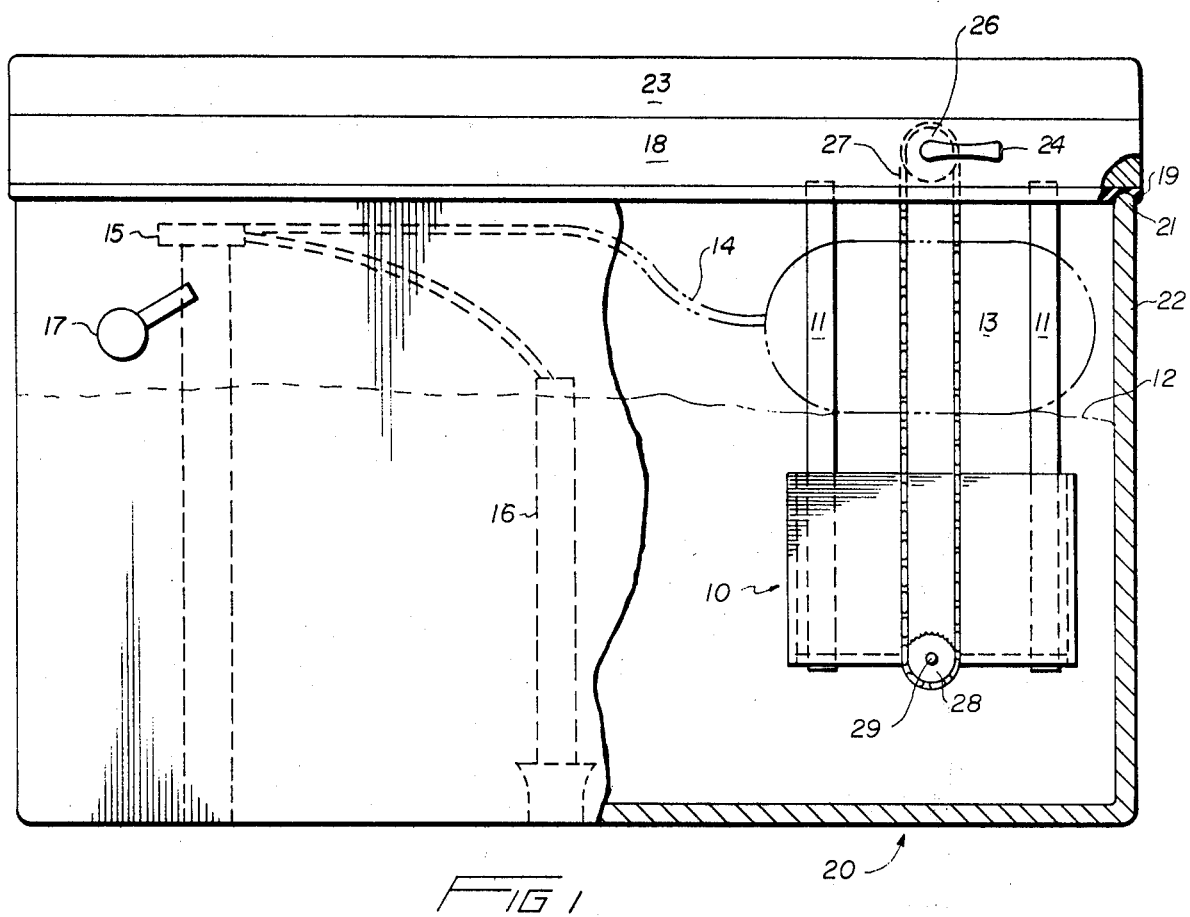
FIG. 1 is a partial sectional view of a typical water closet with the instant apparatus installed.

Referring now to the drawings in detail wherein like reference numerals represent like parts throughout the various drawings, reference numeral 10 in FIG. 1 refers generally to the secondary reservoir. Reservoir hangers 11 suspend the secondary reservoir 10 within the water closet reservoir of toilet tank generally referred to by reference numeral 20. The secondary reservoir 10 is preferably suspended just below the normal water level 12 to ensure that it fills every time the water closet reservoir 20 fills. Shown in phantom in FIG. 1 are the typical members of a water closet including a float 13, float stem 14, a water entry valve 15, a drain tube 16 and a flush lever 17.

In one embodiment of the instant invention, a spacer ring 18 with a rubber gasket 19 is molded to fit on the upper lip 21 of the toilet tank walls 22. The normal lid 23 for the toilet tank 20 is placed on top of the spacer ring 18. The spacer ring 18 provides a location for the water saver control lever 24. The control lever 24 is on a short shaft 25 which passes through the spacer ring 18 in such a manner that it can rotate. On the other end of the shaft 25 is fixed a small sprocket 26 which coacts with a chain 27 and a second sprocket 28 which is fixed to a shaft 29 extending from the secondary reservoir door 30. Thus working in combination a rotation of the control lever 24 causes a rotation of the reservoir door 30 of the same magnitude or different magnitude depending on sprocket size. The reservoir door 30 has peripheral wiper type seals 31 which contact and seal with the sides and one end of the secondary reservoir 10.

Figure 2:
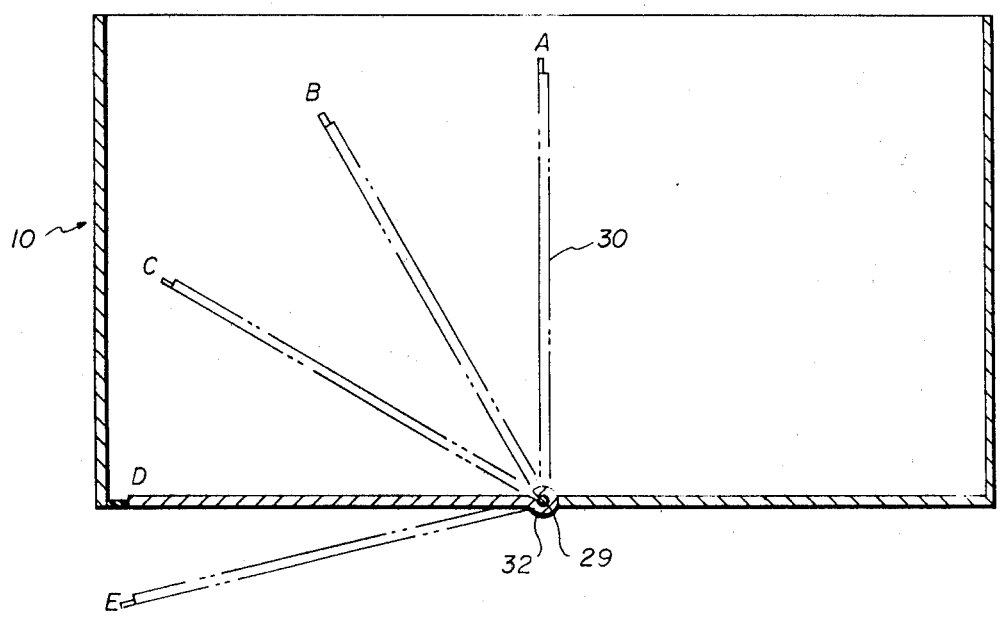
FIG. 2 is a cross-sectional view of the reservoir showing the hinged reservoir door in a variety of positions.

As shown in FIG. 2, the reservoir door 30 is hinged to the bottom of the reservoir 10 by a piano type hinge 32. The door hinge 32 is centrally located in the bottom of the reservoir so that the wiper seal 31 will contact the sides and one far wall of the reservoir tank 10. The position of the reservoir door 30 is set by the position of the control lever 24. The reservoir door can be left in any of a variety of positions, for example, A, B, C, D and E of FIG. 2. In position A the door effectively divides the volume of the reservoir in half. Thus, when the toilet is flushed half of the volume of the reservoir 10 remains. In position B, more than half of the contents of the reservoir 10 remain in the reservoir. In position C, less than half of the contents remain in the reservoir 10. In position D, the entire contents of the reservoir remain within the reservoir because the reservoir door 30 and its seal 31 effectively seal the entire bottom of the reservoir 10. In position E, the entire contents of the reservoir are allowed to escape thus the entire contents of the water closet 20 are used to evacuate the toilet bowl. The amount of water retained in the reservoir 10 is controlled by the control lever 24.

As mentioned above, the secondary reservoir 10 is suspended inside the toilet tank 20 by means of hanger 11 as shown in FIG. 5. The upper portion of the hanger 11 forms an L-shaped bracket 33 which engages the lip 21 of the toilet tank walls 22. The bottom 34 of the hanger 11 is also L-shaped and engages the bottom of the reservoir 10. The hanger 11 on the door-side of the reservoir 10 does not necessarily extend across the bottom of the reservoir but simply may engage the bottom of the reservoir by an adhesive or woodscrew.

Also shown in FIG. 4 is an alternate or additional means of supporting the reservoir 10. In this embodiment a hanger strip 35 is combined with a circular clamp 36 to engage and receive support from the drain tube 16 or any other proximate member of the water closet 20.

FIG. 5 shows an alternate embodiment in deployment of the control lever mechanism 24. In this embodiment the need for the spacer ring 18 is eliminated because the control lever 24 and the control lever shaft 25 travel through the center of the normal flushing handle mechanism 41 which rides on a bushing 42 in the toilet tank wall 22. On the other end of the shaft 25 is affixed the drive sprocket 26 as mentioned before. This embodiment requires a special flushing handle 41 with a hollow core to allow the independent passage of the control lever shaft 25 into the internal areas of the water closet 20.

Having thus described the invention, it should be apparent that numerous structural modifications are contemplated as being a part of this invention as set forth hereinabove and defined hereinbelow by the claims.

What I claim is:

1. A device for saving water in toilet water closets and the like, comprising in combination:
    a reservoir disposed within the closet oriented so that at least a portion of said reservoir is below an associated normal water level,
    means for admitting water into said reservoir,
    means for discharging water from said water closet,
    means for cooperating with said reservoir to incrementally retain amounts of water in said reservoir varying from zero to the full capacity of said reservoir upon flushing water from the water closet,
    means external of said water closet for incrementally positioning said means for cooperating whereby the amount of water used in flushing the toilet can be varied in accordance with demand.

2. The device of claim 1 wherein said means for controlling the amount of water discharged from said reservoir includes a moveable door which is oriented to provide a partition within said reservoir.

3. The device of claim 2 wherein said door includes a peripheral wiper seal for retarding unwanted water migration.

4. The device of claim 3 wherein said door pivots about a shaft connected to an external control lever.

5. The device of claim 4 wherein said reservoir is supported in the water closet by hanger means.

6. The device of claim 5 wherein said control lever is connected to said door shaft through a chain interconnected by sprockets, one on said door shaft and another on a control lever shaft which carries said control lever.

7. The device of claim 6 wherein said hanger means includes a bracket with bent extremities, one extremity looped over a water closet lip, another extremity to a bottom face of said reservoir, and a circular clamp disposed on a water closet tube connected to said reservoir by a hanger strap.

8. The device of claim 6 wherein said control lever is provided on a spacer placed between a water closet top and the water closet.

9. The device of claim 6 wherein said control lever is disposed concentric to a flushing lever, said flushing lever having a central bore to accommodate said control lever shaft.

10. In the water closet of claim 1 a water discharge lever defining said discharging means, said reservoir carried in the water closet oriented to contain a portion of the water normally disposed in the water closet, said external means defined by a reservoir lever means connected to a moveable door defining said cooperating means provided on said reservoir which said moveable door alters the amount of water retained in said reservoir upon actuation of the water discharge lever, said reservoir lever means disposed upon and accessible from an exterior of the water closet,
    whereby setting of said reservoir lever means and therefor said moveable door prior to actuation of the water discharge lever incrementally controls the amount of water discharged from said reservoir means.

11. The water closet of claim 10 wherein said reservoir means comprises an open top container which allows reception therethrough of the water closet water,
    said moveable panel disposed on a bottom wall of said container and forming half of the surface of said bottom wall,
    hinge means connecting said moveable door to said reservoir container,
    and sealing means peripherally disposed on said moveable door and engaging said reservoir container to retain a portion of the container water therewithin.

12. The water closet of claim 11 including a linkage means connecting said reservoir lower means to said moveable door.

13. The water closet of claim 12 including hanger means to support said reservoir means on the water closet.

14. The water closet of claim 13 wherein said reservoir means is of box shaped configuration, said hinge means is operatively associated with a shaft having a sprocket thereon, a sprocket on said reservoir lever means, and chain means between and connecting said sprockets.

15. A device for saving water in toilet water closets and the like, comprising in combination;
   a reservoir disposed within the closet oriented so that at least a portion of said reservoir is below an associated normal water level,
   means for admitting water into said reservoir,
   means for discharging water from said reservoir upon flushing water from the rest of the water closet and
   means for controlling the amount of water discharged from said reservoir, whereby the amount of water used in flushing the toilet can be varied in accordance with demand wherein said means for controlling the amount of water discharged from said reservoir includes a moveable door which is oriented to provide a partition within said reservoir wherein said door includes a peripheral wiper seal for retarding unwanted water migration wherein said door pivots about a shaft connected to an external control lever.

16. The device of claim 15 wherein said reservoir is supported in the water closet by hanger means.

17. The device of claim 16 wherein said hanger means includes a bracket with bent extremities, one extremity looped over a water closet lip, another extremity to a bottom face of said reservoir, and a circular clamp disposed on a water closet tube connected to said reservoir by a hanger strap.

18. The device of claim 15 wherein said control lever is connected to said door shaft through a chain interconnected by sprockets, one on said door shaft and another on a control lever shaft which carries said control lever.

19. The device of claim 15 wherein said control lever is provided on a spacer placed between a water closet top and the water closet.

20. The device of claim 15 wherein said control lever is disposed concentric to a flushing lever, said flushing lever having a central bore to accommodate said control lever shaft.

* * * * *